(12) United States Patent
Lee et al.

(10) Patent No.: US 7,061,537 B2
(45) Date of Patent: Jun. 13, 2006

(54) ADAPTIVE DEFLICKER METHOD AND ADAPTIVE DEFLICKER FILTER

(75) Inventors: Chuan-Chen Lee, Hsinchu (TW); Chia-Liang Tai, Hsinchu (TW); Yi-Chieh Huang, Hsinchu (TW)

(73) Assignee: Via Technologies, Inc., Taipei (TW)

( * ) Notice: Subject to any disclaimer, the term of this patent is extended or adjusted under 35 U.S.C. 154(b) by 564 days.

(21) Appl. No.: 10/292,729

(22) Filed: Nov. 12, 2002

(65) Prior Publication Data

US 2003/0174247 A1    Sep. 18, 2003

(30) Foreign Application Priority Data

Mar. 12, 2002  (TW) ............................... 91104621 A

(51) Int. Cl.
H04N 7/01 (2006.01)
H04N 11/20 (2006.01)

(52) U.S. Cl. ............... 348/447; 348/448; 348/447; 345/428; 382/199; 382/266

(58) Field of Classification Search ........ 348/446–447, 348/448, 910; 382/199, 266; 345/428; H04N 7/01, H04N 11/20
See application file for complete search history.

(56) References Cited

U.S. PATENT DOCUMENTS

| | | | |
|---|---|---|---|
| 4,947,251 A * | 8/1990 | Hentschel | 348/452 |
| 5,146,329 A * | 9/1992 | Flamm | 348/607 |
| 5,247,354 A * | 9/1993 | Nakajima | 348/621 |
| 5,270,714 A | 12/1993 | Tanaka et al. | |
| 5,510,843 A * | 4/1996 | Keene et al. | 348/446 |
| 5,526,051 A | 6/1996 | Gove et al. | |
| 5,608,468 A | 3/1997 | Gove et al. | |
| 5,627,555 A * | 5/1997 | den Hollander | 345/12 |
| 5,633,687 A | 5/1997 | Bhayani et al. | |
| 5,657,089 A | 8/1997 | Onagawa | |
| 5,781,241 A * | 7/1998 | Donovan | 348/441 |
| 5,812,139 A * | 9/1998 | Morimoto | 345/428 |
| 5,822,008 A * | 10/1998 | Inoue et al. | 348/446 |
| 5,856,963 A | 1/1999 | Inagawa et al. | |
| 5,892,551 A * | 4/1999 | Uematsu | 348/447 |
| 5,894,330 A * | 4/1999 | Huang et al. | 348/447 |
| 5,910,820 A * | 6/1999 | Herz et al. | 348/446 |
| 5,912,710 A | 6/1999 | Fujimoto | |
| 5,912,711 A | 6/1999 | Lin et al. | |
| 5,912,714 A | 6/1999 | Kawamura | |
| 5,914,753 A * | 6/1999 | Donovan | 348/441 |
| 5,936,968 A | 8/1999 | Lyons | |
| 5,963,261 A | 10/1999 | Dean | |
| 5,963,262 A * | 10/1999 | Ke et al. | 348/447 |

(Continued)

FOREIGN PATENT DOCUMENTS

JP        07-059052        3/1995

*Primary Examiner*—Brian P. Yenke
(74) *Attorney, Agent, or Firm*—Volpe and Koenig, P.C.

(57) ABSTRACT

An adaptive deflicker method for use in converting a non-interlacing scan data into an interlacing scan data is disclosed. The method includes the steps of receiving a non-interlacing scan data, wherein the non-interlacing scan data includes plural scan lines, proceeding a deflicker operation on an edge line of the non-interlacing scan data, exempting a non-edge line of the non-interlacing scan data from the deflicker operation, and converting the non-interlacing scan data into an interlacing scan data. In addition, an adaptive deflicker filter for use in converting a non-interlacing scan data into an interlacing scan data is also disclosed. The adaptive deflicker filter includes an edge-line detector and a deflicker filter.

24 Claims, 11 Drawing Sheets

U.S. PATENT DOCUMENTS

| | | | |
|---|---|---|---|
| 5,990,965 A * | 11/1999 | Herz et al. | 348/446 |
| 6,002,442 A * | 12/1999 | Li et al. | 348/447 |
| 6,028,641 A | 2/2000 | Kim | |
| 6,069,666 A | 5/2000 | Lyons | |
| 6,084,568 A | 7/2000 | Premi et al. | |
| 6,094,226 A * | 7/2000 | Ke et al. | 348/446 |
| 6,108,041 A | 8/2000 | Faroudja et al. | |
| 6,118,488 A * | 9/2000 | Huang | 348/452 |
| 6,130,723 A * | 10/2000 | Medin | 348/607 |
| 6,275,234 B1 | 8/2001 | Iwaki | |
| 6,281,933 B1 * | 8/2001 | Ritter | 348/447 |
| 6,285,402 B1 | 9/2001 | Miyazaki et al. | |
| 6,307,896 B1 | 10/2001 | Gumm et al. | |
| 6,346,970 B1 * | 2/2002 | Boehlke | 348/447 |
| 6,359,653 B1 * | 3/2002 | Huang | 348/447 |
| 6,441,857 B1 | 8/2002 | Wicker et al. | |
| 6,563,544 B1 * | 5/2003 | Vasquez | 348/447 |
| 6,597,402 B1 | 7/2003 | Butler et al. | |
| 6,650,372 B1 * | 11/2003 | Toft | 348/615 |
| 6,704,056 B1 | 3/2004 | Kitahara et al. | |
| 6,757,022 B1 * | 6/2004 | Wredenhagen et al. | 348/452 |
| 6,795,043 B1 | 9/2004 | Shibata | |
| 6,801,591 B1 | 10/2004 | Frencken | |
| 6,898,327 B1 * | 5/2005 | Hrusecky et al. | 382/260 |
| 2002/0101535 A1 * | 8/2002 | Swan | 348/448 |
| 2002/0113891 A1 | 8/2002 | Felts | |
| 2003/0007686 A1 | 1/2003 | Roever | |
| 2003/0067552 A1 | 4/2003 | Leyvi et al. | |
| 2003/0095205 A1 * | 5/2003 | Orlick et al. | 348/448 |
| 2003/0098925 A1 * | 5/2003 | Orlick | 348/448 |
| 2003/0174246 A1 * | 9/2003 | Lee et al. | 348/446 |

* cited by examiner

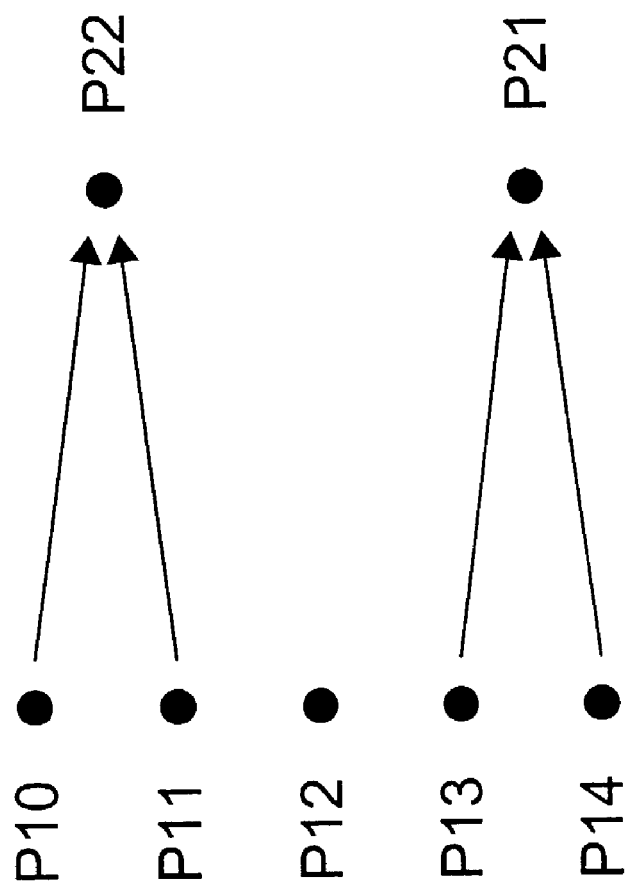

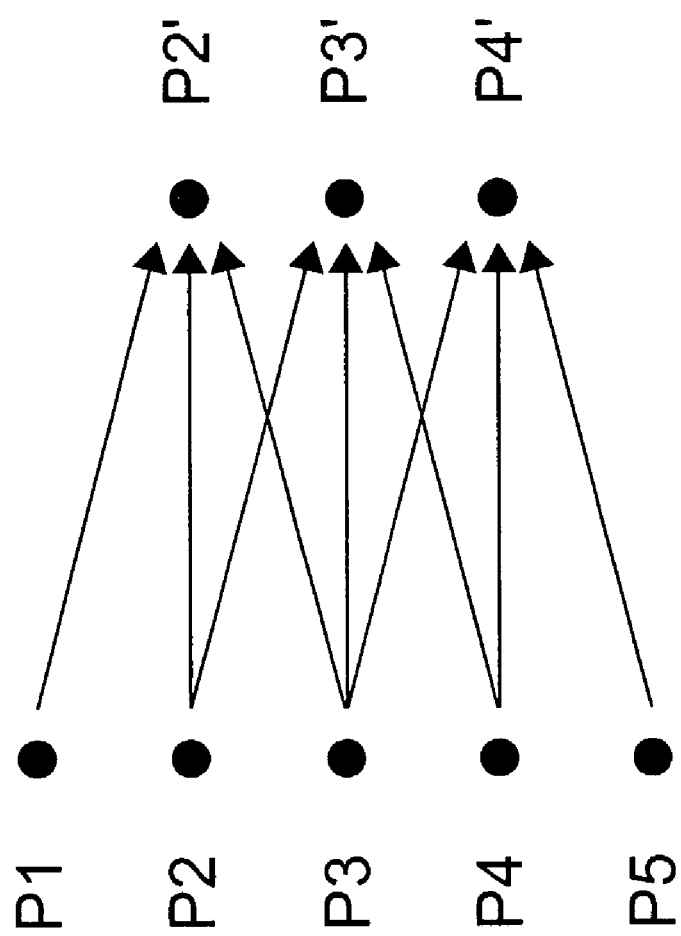

Fig.5

ADAPTIVE DEFLICKER METHOD AND ADAPTIVE DEFLICKER FILTER

FIELD OF THE INVENTION

The present invention relates to an adaptive deflicker method, and more particularly to an adaptive deflicker method for use in the process of converting a non-interlacing scan data to an interlacing scan data. The present invention also relates to an adaptive deflicker filter, and more particularly to an adaptive deflicker filter for deflickering image in order to convert a non-interlacingly scanned image data to an interlacingly scanned image data without deteriorating image quality.

BACKGROUND OF THE INVENTION

Nowadays, many electrical appliances are widely used with computers due to the amazing power of computers. For example, video compact disks (VCDs) and digital versatile disks (DVDs) are able to be played by a personal computer. Since the size of a typical computer monitor is not large enough to exhibit the spectacular video effect of the VCD or DVD disks, it is preferred that the signals be outputted from the personal computer to a TV set to be displayed on the relatively large TV screen. The purpose can be achieved by employing a display adapter.

FIG. 1A is a partial functional block diagram of a typical display adapter. The pixel parallel digital signals from a graphic chip 10 are selectively converted into a proper format of analog signals via either a random access memory digital-to-analog converter (RAM DAC) 11 or a TV encoder 12, and delivered to a computer monitor 13 or a TV screen 14, respectively, for display. Further, for TV analog signals, two formats, i.e. the NTSC (National Television Standards Committee) standard and the PAL (Phase Alternate Line) standard, are involved.

The functional block diagram of the TV encoder 12 can be seen in FIG. 1B. The pixel parallel digital signals from the graphic chip 10 is processed by a data capture device 121, a color space converter 122, a scaler and deflicker 123, an NTSC/PAL encoder 124 and a digital-to-analog converter 125 to produce the TV analog signals either in the NTSC or PAL standard.

The functional block diagram of a conventional scaler and deflicker 123 can be seen in FIG. 1C. In the NTSC standard and the PAL standard, the numbers of horizontal scan lines are 525 and 625 per frame, respectively, either of which is different from that in the computer monitor standard, e.g. 600 per frame or 768 per frame. Thus, the image data outputted from the color space converter 122 needs to be scaled to be of a proper number of horizontal scan lines by a scaler 1231. The scaling step is usually proceeded by a bilinear algorithm. For example, when five scan lines are scaled into four scan lines, the color space values of the resulting second scan line correlates to those of the original second and third scan lines. Likewise, the color space values of the resulting third scan line correlates to those of the original third and fourth scan lines. For easily understanding the bilinear algorithm operation, each scan line mentioned in the above is represented by a pixel, and the conversion is illustrated as shown in FIG. 2A. The color space values of the resulting pixel P41 is equal to that of the original pixel P51. The color space values of the resulting pixels P42, P43 and P44 are obtained by the operations of 3(P52)/4+1(P53)/4, 2(P53)/4+2(P54)/4 and 1(P54)/4+3(P55)/4, respectively, in which (P52), (P53), (P54) and (P55) are respective color space values of the original pixels P52, P53, P54 and P55. In addition, because the TV frame is displayed in a manner of interlacing scanning, the scaled image data needs to be divided into two fields, i.e. an odd field and an even field, which are interlacingly displayed. Hence, when a non-interlacingly scanned image data is converted into an interlacing image data, a horizontal scan line of a single pixel height only appears in one of fields so as to cause a flicker phenomenon when displaying. For ruling out this phenomenon, a deflicker 1232 performs a filter process with a predetermined coefficient of [¼, ½, ¼] on each of received horizontal scan lines. In other words, each horizontal scan line is re-defined by weightingly calculating an immediately above and an immediately below scan lines, and the scan line itself. Please refer to the pixels shown in FIG. 2B. The color space value of the pixel P2' is re-defined by (P1)/4+(P2)/2+(P3)/4, in which (P1), (P2), and (P3) are respective color space values of the original pixels P1, P2, and P3. Therefore, the color feature of the scan line will appear in both fields, so the flicker phenomenon can be avoided or minimized.

Along with the increasing number of horizontal scan lines in each computer monitor frame, for example up to 768, 864, 1024 or even 1200 scan lines, the scaler 1231 needs to proceed a quite large vertical reduction rate. When the scaling factor is down to a value smaller than about 0.7, the line-loss problem could occur. That is, some horizontal scan lines will not be referred by any of the re-defined scan lines, or the re-defined image data will not incorporate therein the data of the lost line. As shown in FIG. 2C, the pixel P12 indicates a lost pixel that is referred by neither the pixel P22 nor the pixel P21. Thus, the color data of P12 will be lost because of the scaling procedure, resulting in a poor image quality. Furthermore, the image quality will become worse after the color data is processed by the aforementioned deflickering operation of the device 1232.

Therefore, the purpose of the present invention is to develop a method and a device for adaptively deflickering to deal with the above situations encountered in the prior art.

SUMMARY OF THE INVENTION

An object of the present invention is to provide an adaptive deflicker method and an adaptive deflicker filter for performing deflickering operations on certain scan lines only in order to achieve deflickering effects while avoiding over blurization so as to assure of good image quality.

According to an aspect of the present invention, there is provided an adaptive deflicker method for use in converting a non-interlacing scan data into an interlacing scan data. The method includes the steps of receiving a non-interlacing scan data, wherein the non-interlacing scan data includes plural scan lines, proceeding a deflicker operation on an edge line of the non-interlacing scan data, exempting a non-edge line of the non-interlacing scan data from the deflicker operation, and converting the non-interlacing scan data into an interlacing scan data.

In an embodiment, the edge line is a horizontal scan line segment having a length larger than or equal to a threshold value.

Preferably, the deflicker operation is proceeded by replacing a color space value of a selected pixel of the edge line with a combination value of those of the selected pixel and pixels of scan lines immediately above and below the edge line at positions corresponding to the selected pixel. The combination value is preferably a linear combination value of color space values of three pixels of three consecutive scan lines, respectively, at corresponding positions. For example, the linear combination value is obtained with a linear combination coefficient of [¼, ½, ¼].

Preferably, the edge line is determined by the steps of comparing a color space value of a first pixel of a selected one of the scan lines with that of a second pixel of another scan line immediately adjacent to the selected scan line at a position corresponding to the first pixel, determining the first pixel to be an edge point when the norm of a color space value difference of the first and second pixels is larger than or equal to a preset value, and determining the selected scan line to be the edge line when a count of consecutive edge points included in the selected scan line is-larger than or equal to a threshold value N. The another scan line immediately adjacent to the selected scan line can be above or below the selected scan line. A middle point of each group consisting of N consecutive edge points is defined as a large-edge point, and the deflicker operation is performed on the large-edge point of the edge line.

Preferably, before the deflicker operation the adaptive deflicker method further includes the steps of replacing color space values of a selected one of the scan lines in the non-interlacing scan data with a combination of color space values of the selected scan line and at least one adjacent scan line to obtain a blurringly filtered non-interlacing scan data, and scaling the blurringly filtered non-interlacing scan data according to a bilinear algorithm.

Preferably, the combination is a linear combination of color space values of the selected scan line and two adjacent scan lines.

For example, the coefficient of the linear combination can be [¼, ½, ¼] or [⅓, ⅓, ⅓].

According to another aspect of the present invention, there is provided an adaptive deflicker filter for use in converting a non-interlacing scan data into an interlacing scan data. The adaptive deflicker filter includes an edge-line detector for receiving a non-interlacing scan data and outputting an enable signal when an edge line segment having a length larger than or equal to a threshold value N is detected in the non-interlacing scan data, and a deflicker filter electrically connected to the edge-line detector for proceeding a deflicker operation on the edge line segment in response to the enable signal.

Preferably, the edge line segment consists of a plurality of consecutive edge points, each of which is a pixel having a color space value difference with a corresponding pixel of another scan line immediately adjacent to the selected scan line larger than or equal to a preset value, and the deflicker operation is performed on a middle one of every N consecutive edge points of the edge line segment. The another scan line immediately adjacent to the selected scan line can be the one above or below the selected scan line.

Preferably, the deflicker operation is performed by a linear combination of color space values of the middle edge point of the edge line segment and respective two pixels of two scan lines immediately adjacent to the edge line segment with a certain linear combination coefficient.

Preferably, the deflicker filter proceeds a [0, 1, 0] linear combination in the absence of the enable signal, and proceeds the linear combination with the certain linear combination coefficient in response to the enable signal. For example, the certain linear combination coefficient can be [¼, ½, ¼] or [⅓, ⅓, ⅓].

Preferably, the adaptive deflicker filter further includes a register electrically connected to the edge-line detector for storing the linear combination coefficient.

According to a further aspect of the present invention, there is provided an adaptive deflicker method for use in converting a non-interlacing scan data into an interlacing scan data. The method includes the steps of receiving a non-interlacing scan data, proceeding a deflicker operation only on large-edge points of the non-interlacing scan data, each of which follows a threshold number of consecutive edge points and precedes the threshold number of consecutive edge points, and converting the non-interlacing scan data into an interlacing scan data.

BRIEF DESCRIPTION OF THE DRAWINGS

The present invention may best be understood through the following description with reference to the accompanying drawings, in which:

FIG. 2C is a schematic diagram illustrating a line-loss situation for a relatively low scaling factor;

FIG. 3C is a diagram illustrating a preferred embodiment of a blurring operation according to the present invention;

FIG. 5 is a schematic diagram exemplifying the pixels of an edge line to be deflickered according to an adaptive deflicker method of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3A:
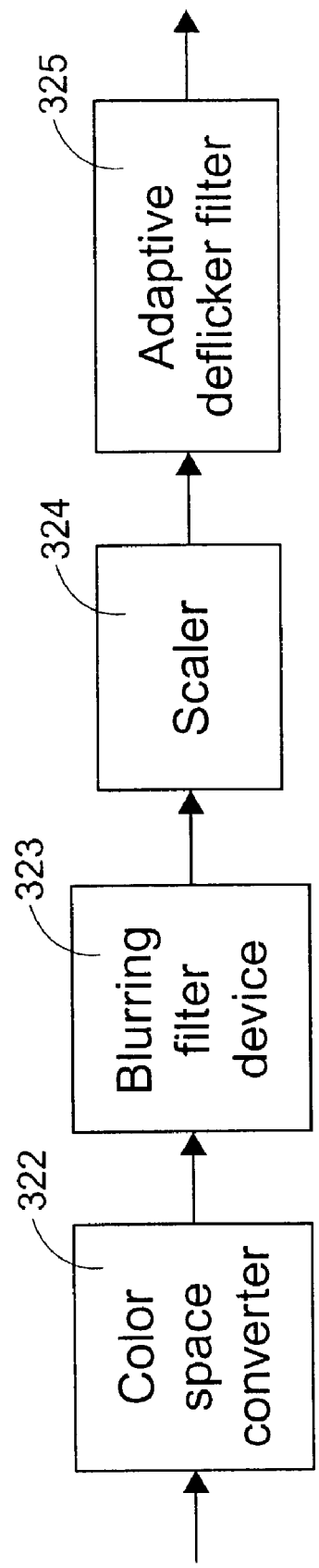
FIG. 3A is a functional block diagram illustrating a preferred embodiment of a TV encoder according to the present invention.

Please refer to FIG. 3A which is a schematic functional block diagram illustrating a preferred embodiment of a TV encoder according to the present invention. After being inputted into a color space converter 322, a non-interlacing scan data consisting of horizontal scan lines is received and processed by a blurring filter device 323. The color space value of each scan line, indicated by a single pixel in the figure for simplification purpose, in the non-interlacing scan data is replaced by a combination value of that of the line and the adjacent lines to obtain a blurringly filtered non-interlacing scan data. Subsequently, the blurringly filtered non-interlacing scan data is scaled by a scaler 324, processed by an adaptive deflicker filter 325 and then converted into an interlacing scan data.

Figure 3B:
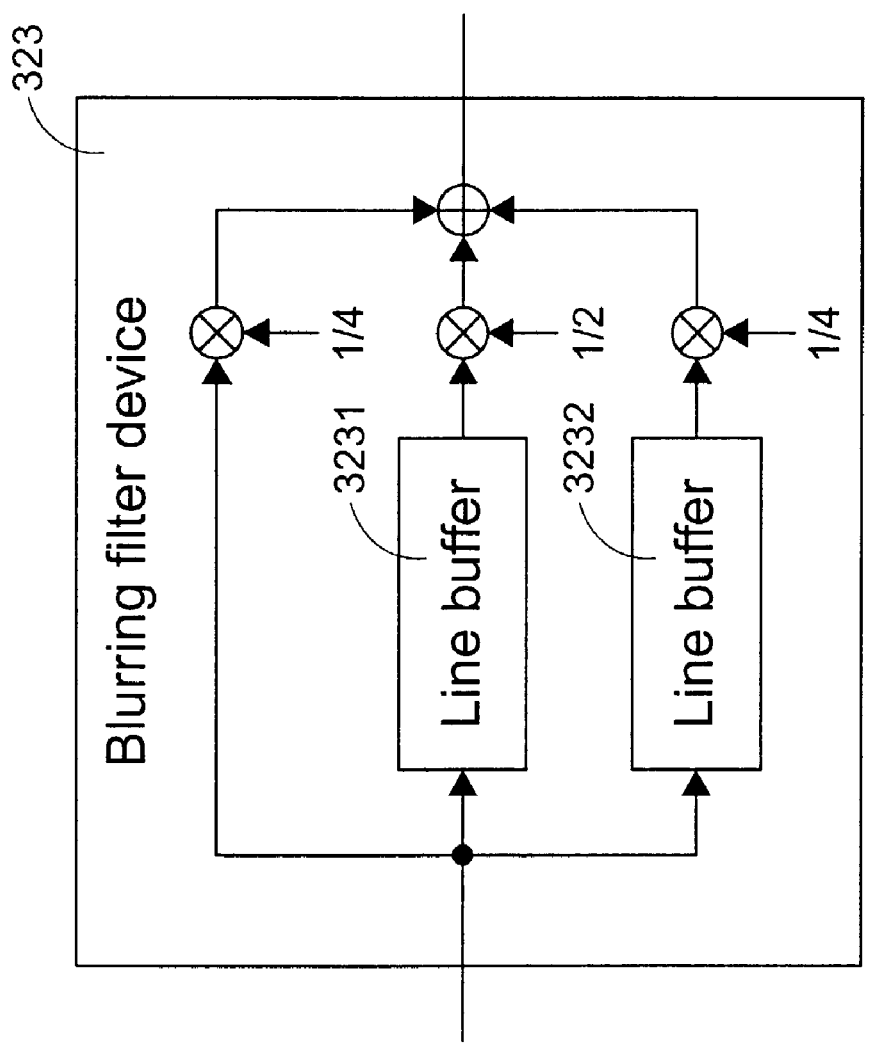
FIG. 3B is a functional block diagram illustrating a preferred embodiment of the blurring filter device in FIG. 3A.

FIG. 3B is a functional block diagram illustrating a preferred embodiment of the blurring filter device in FIG. 3A. The blurring filter device 323 includes two line buffers 3231 and 3232, which are used for storing two continuous horizontal scan lines of the non-interlacing scan data, respectively. When next line enters, the color space values of the coming horizontal scan line and two previously stored horizontal scan lines are processed by a filter operation to execute a linear combination under the coefficient [¼, ½, ¼]. The resulting color space value replaces the original one of the immediately scan line to realize a blurringly filtered scan line. That is, the color space value of each horizontal scan line is re-defined by a weighting operation of the color space values of the selected horizontal scan line and two immediately adjacent horizontal scan lines above and below the selected scan lines, respectively. Then, a blurringly filtered non-interlacing scan data is obtained. It is to be noted that the coefficient of the linear combination can be modified according to the practical requirement. For the easy understanding of the present invention, an example is given herein with reference to the diagram of FIG. 3C to describe the present invention in details. In order to simplify the drawing, each scan line is represented by a pixel, and the blurringly filtering conversion is illustrated as shown in FIG. 3C. First of all, the color data of the original pixels P1 and P2 is stored in the line buffers 3232 and 3231, respectively. When the color data of the original pixel P3 is inputted to the blurring filter device 323, the color space value of the resulting pixel P2' is obtained by the operation of (P1)/4+(P2)/2+(P3)/4, in which (P1), (P2) and (P3) are respective color space values of the original pixels P1, P2 and P3. Subsequently, the color data of the original pixels P2 and P3 is stored in the line buffers 3232 and 3231, respectively. Likewise, when the color data of the original pixel P4 is inputted to the blurring filter, the color space value of the resulting pixel P3' is obtained by the operation of (P2)/4+(P3)/2+(P4)/4, in which (P2), (P3) and (P4) are respective color space values of the original pixels P2, P3 and P4. Thus, the color space value of the resulting pixel P2' is defined by the combination value of the color space values of the pixel itself, i.e. (P2), the above-adjacent pixel, i.e. (P1) and the below-adjacent pixel, i.e. (P3). Likewise, the color space value of the resulting pixel P3' is defined by the combination value of the color space values of the pixel itself (P3), the above-adjacent pixel (P2) and the below-adjacent pixel (P4). Similarly, the color space value of the resulting pixel P4' is equal to (P3)/4+(P4)/2+(P5)/4. According to the above embodiment, the color data of the original pixel P3 is incorporated in those of the resulting pixels P2', P3' and P4'. Hence, after the blurringly filtering procedure, the color character of each scan line will be imparted to the adjacent scan lines. Even though a relatively large vertical reduction rate is required for scaling and a line-loss problem is rendered, the color data of the lost line can be revealed by other scan lines. Thus, good image quality can be assured after scaling.

Figure 1A:
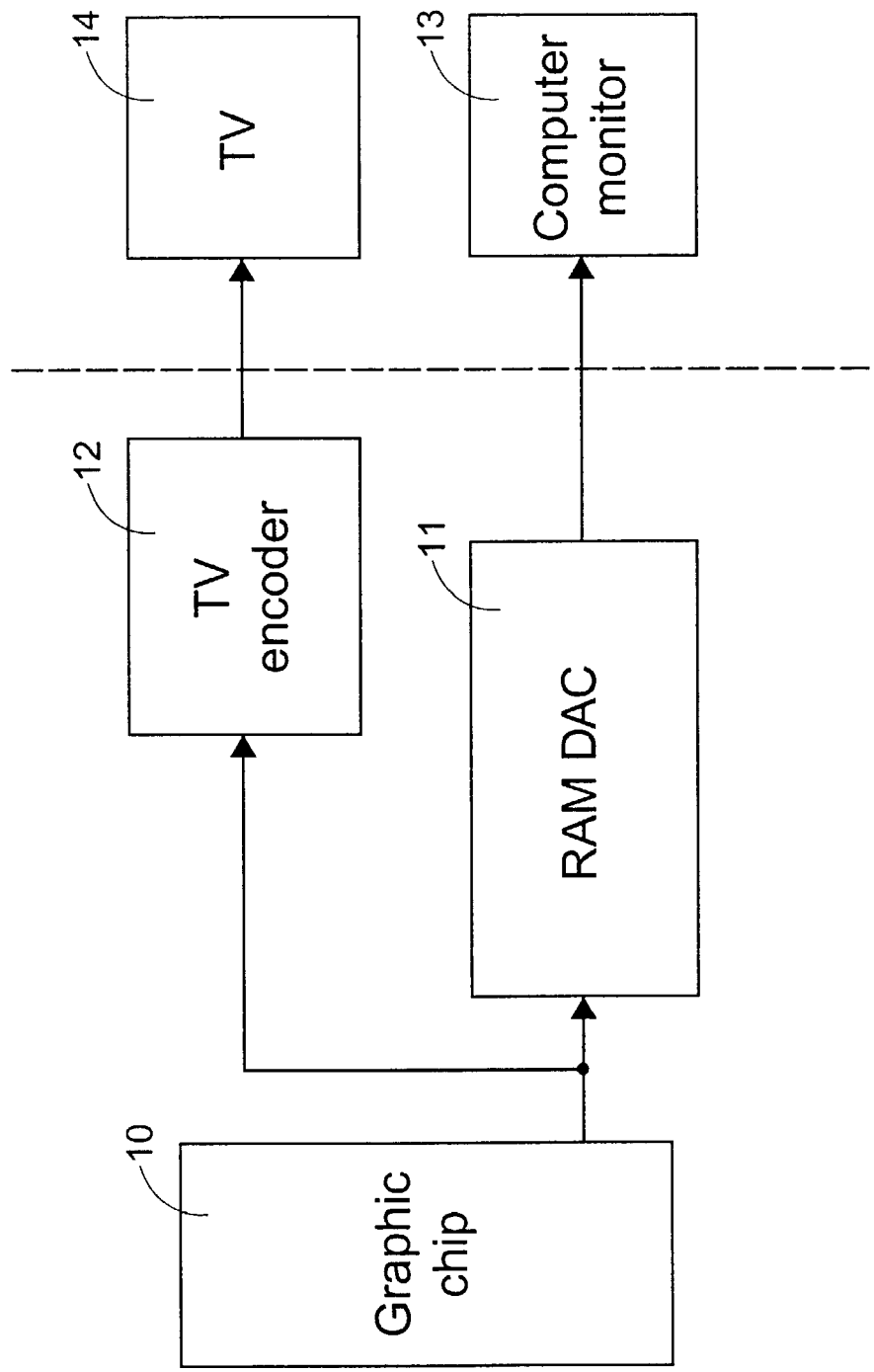
FIG. 1A is a partial functional block diagram illustrating a typical display adapter.
Figure 1B:
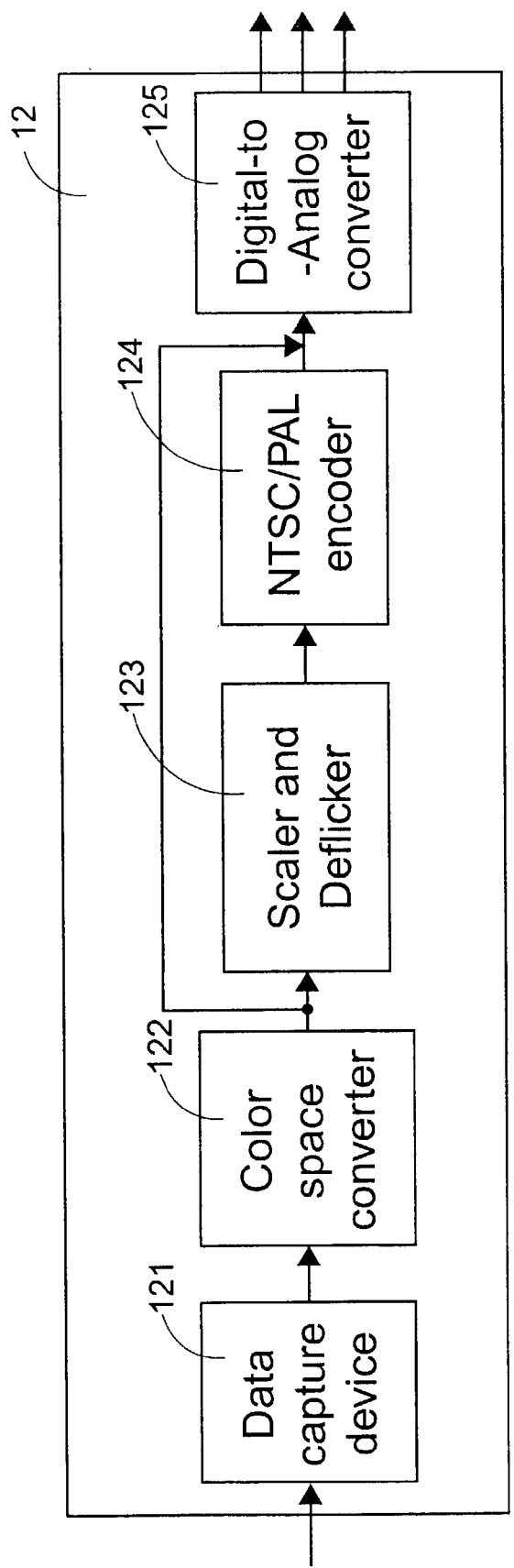
FIG. 1B is a functional block diagram illustrating the TV encoder in FIG. 1A.
Figure 1C:
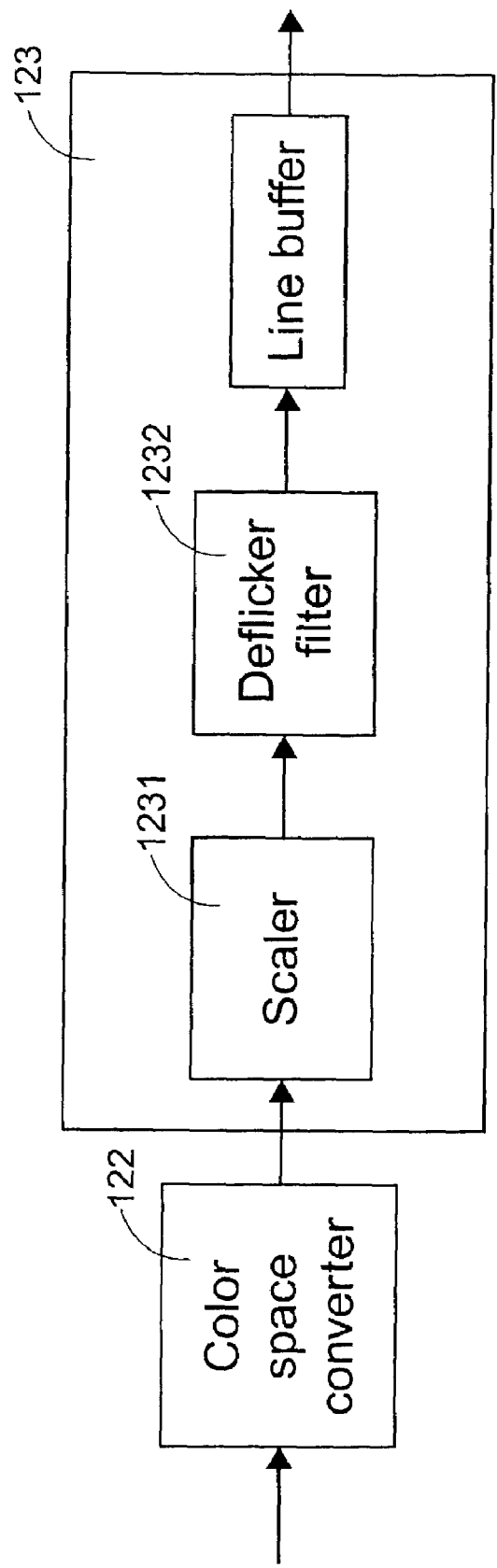
FIG. 1C is a functional block diagram illustrating the scaler and deflicker in FIG. 1B.
Figure 2A:
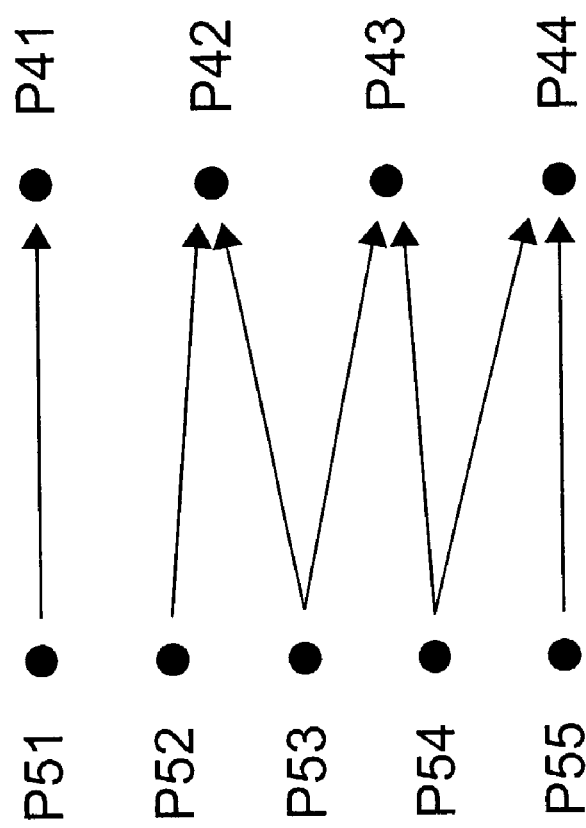
FIG. 2A is a diagram illustrating a conventional bilinear algorithm.
Figure 2B:
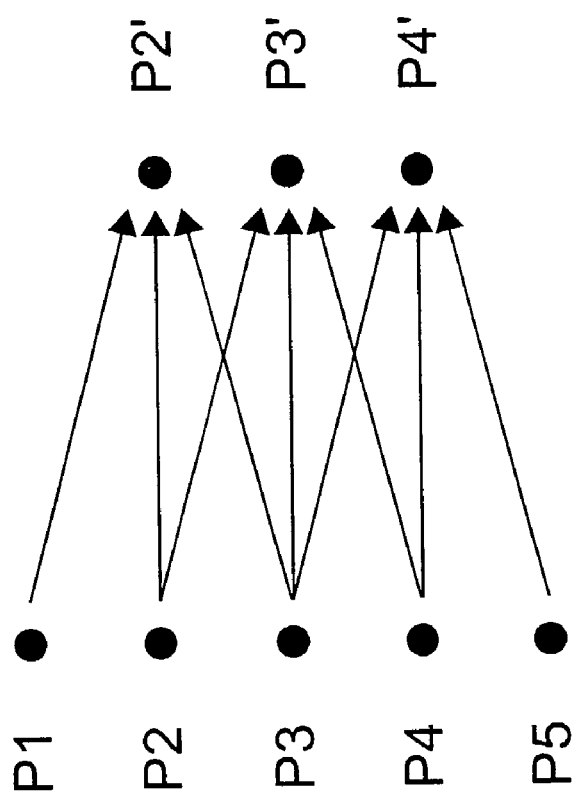
FIG. 2B is a schematic diagram illustrating a deflickering operation.

For avoiding a flicker phenomenon occurring when the image is converted to the interlacing scan data, the blurringly filtered and scaled non-interlacing scan data is subject to a deflicker operation as mentioned above with reference to FIG. 2B. However, the image will be even blurry so as to deteriorate the image quality after such deflicker operation. Hence, the adaptive deflicker filter 325 of the present invention is provided to solve this problem.

Figure 4:
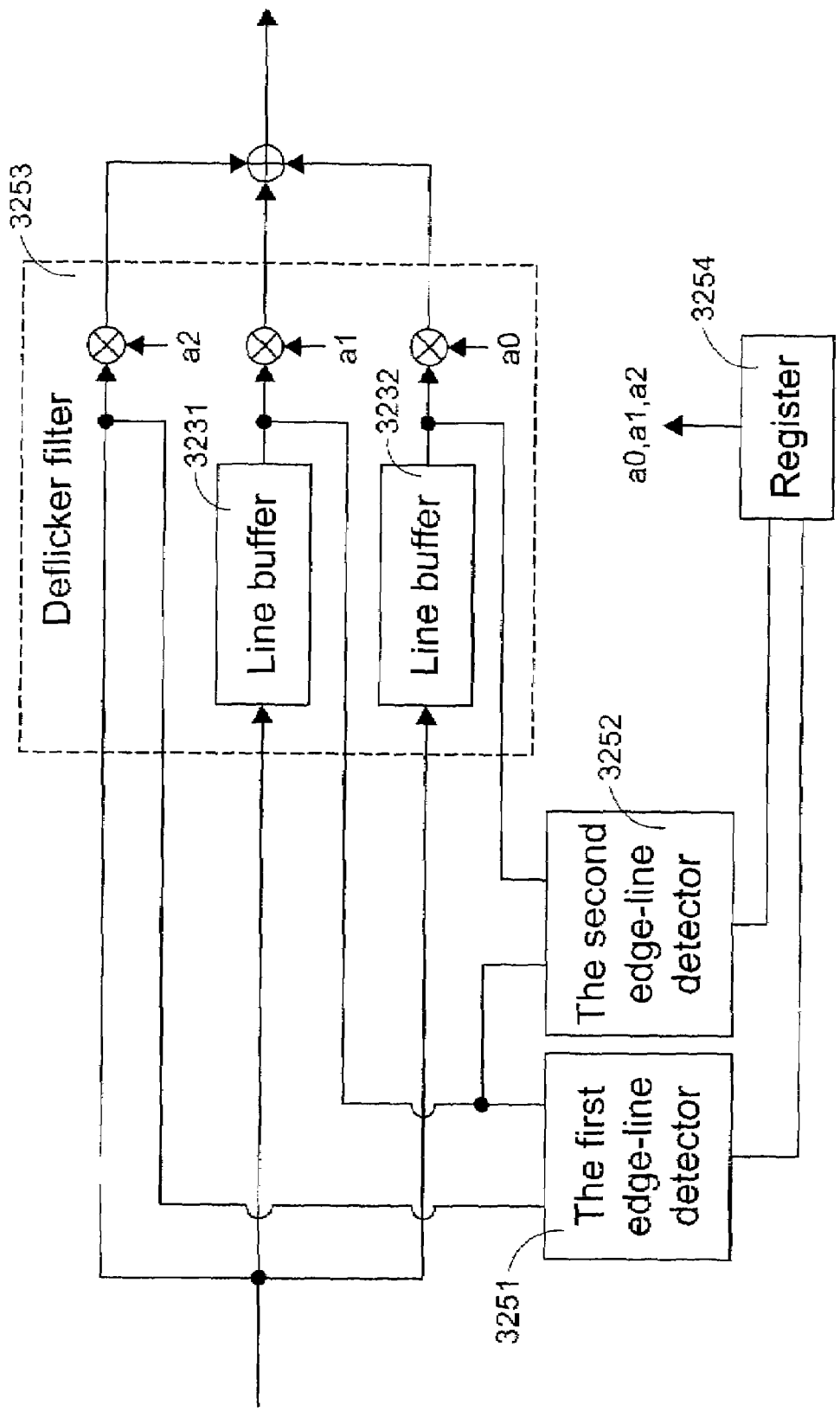
FIG. 4 is a functional block diagram illustrating a preferred embodiment of an adaptive deflicker filter according to the present invention.

Please refer to FIG. 4 which is a functional block diagram illustrating a preferred embodiment of an adaptive deflicker filter according to the present invention. The first edge-line detector 3251 reads thereinto two scan lines, i.e. a selected horizontal scan line and another horizontal scan line immediately above the selected scan line for the detector 3251. The second edge-line detector 3252 reads thereinto two scan lines, i.e. the selected horizontal scan line and another horizontal scan line immediately below the selected scan line for the detector 3252. When the color space value difference of a pixel of the selected horizontal scan line and a pixel of the horizontal scan line immediately above or below the selected scan line at a corresponding pixel position is larger than or equal to a preset value, the pixel of the selected horizontal scan line is determined to be an edge point. Furthermore, when the count of consecutive edge points included in the selected horizontal scan line is larger than or equal to a threshold value, the consecutive edge points of the selected horizontal scan line is determined to be an edge line. If the scan line inputted into the deflicker filter 3253 is not determined to be an edge line, the deflicker problem is generally not serious, so it is not necessary to deflicker the scan line. Therefore, the linear combination coefficient [a0,a1,a2] outputted to the deflicker filter 3253 from the register 3254 would be [0,1,0] in order not to change the feature of the non-edge scan line. When it is the edge line inputted into the deflicker filter 3253, the coefficient of [a0, a1, a2] stored in the register 3254 is changed from [0,1,0] to a predetermined value such as [¼, ½, ¼] or [⅓,⅓,⅓] for proceeding the linear combination operation on the edge line. By the linear combination operation, the color space value of the edge line is re-defined by weightingly calculating the immediately above and the immediately below horizontal scan lines, and the edge line itself to be a linear combination value. That is, the edge line is incorporated thereinto the features of the adjacent scan lines so as to avoid the flicker phenomenon.

Figure 5:
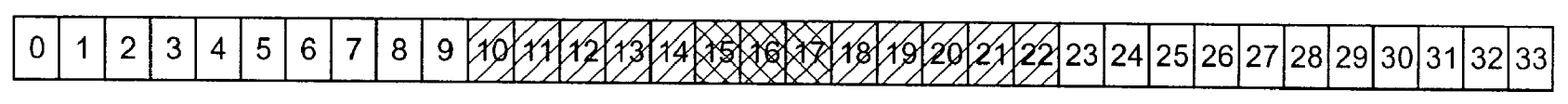

In another embodiment, a deflicker operation is only proceeded on large-edge points of a non-interlacing scan data. The term "large-edge points" indicates the pixels exhibiting significant contrast to their neighbors. For easily understanding how to determine the large-edge points, an example is described with reference to FIG. 5. Each lattice represents a pixel of a horizontal scan line. When the threshold value for determining the large-edge point is set to be 11, a sliding window of 11 units in width is used. First, edge points are determined by comparing pixels of three consecutive scan lines at corresponding positions as mentioned above, and pixels 10–22 are found to be edge points. When the count of the consecutive edge points of a certain scan line is larger than the threshold value 11, the scan line is determined to be an edge line. In this case, the scan line as shown is apparently an edge line due to the 13 edge points included therein. The 11-pixel sliding window passes through the edge line to find large-edge points. A pixel will be defined as a large-edge point when its left 5 pixels and its right 5 pixels as well as the pixel itself are edge points. For example, the edge-point pixel 15 is an large-edge point because its left 5 pixels 10–14 and right 5 pixels 16–20 are edge points. Similarly, the pixels 16 and 17 are also large-edge points. Therefore, according to this embodiment, only the large-edge points 15, 16 and 17 will be blurred, i.e. be subject to the deflicker operation, while the other pixels remain unchanged.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An adaptive deflicker method for use in converting a non-interlacing scan data into an interlacing scan data, comprising the steps of:
   receiving a non-interlacing scan data including plural scan lines;
   comparing a color space value of a first pixel of a selected one of said scan lines with that of a second pixel of another scan line immediately adjacent to said selected scan line at a position corresponding to said first pixel, and determining said first pixel to be an edge point when the norm of a color space value difference of said first and second pixels is larger than a preset value;
   repeating locating edge points and defining an edge line including a plurality of consecutive edge points;
   performing a deflicker operation on a selected part of said edge line;
   exempting a non-edge line of said non-interlacing scan data from said deflicker operation; and
   converting said non-interlacing scan data into an interlacing scan data.

2. The adaptive deflicker method according to claim 1 wherein said edge line is a horizontal scan line segment consisting of at least a threshold number of edge points.

3. The adaptive deflicker method according to claim 2 wherein said deflicker operation is performed by replacing a color space value of a selected pixel of said edge line with a combination value of those of said selected pixel and pixels of scan lines immediately above and below said edge line at positions corresponding to said selected pixel.

4. The adaptive deflicker method according to claim 3 wherein said combination value is a linear combination value of color space values of three pixels of three consecutive scan lines, respectively, at corresponding positions.

5. The adaptive deflicker method according to claim 4 wherein said linear combination value is obtained with a linear combination coefficient of [¼, ½, ¼].

6. The adaptive deflicker method according to claim 1 wherein said another scan line immediately adjacent to said selected scan line is above or below said selected scan line.

7. The adaptive deflicker method according to claim 1 wherein said edge line consists of M consecutive edge points and a middle point of each group consisting of N consecutive edge points among said M consecutive edge points is defined as a large-edge point, and said deflicker operation is performed on said large-edge point of said edge line.

8. The adaptive deflicker method according to claim 1 further comprising, before said deflicker operation, the steps of:
   replacing color space values of said selected scan line with a combination of color space values of said selected scan line and at least one adjacent scan line to obtain a blurringly filtered non-interlacing scan data; and
   scaling said blurringly filtered non-interlacing scan data according to a bilinear algorithm.

9. The adaptive deflicker method according to claim 8 wherein said combination is a linear combination of color space values of said selected scan line and two adjacent scan lines.

10. The adaptive deflicker method according to claim 9 wherein said linear combination has a coefficient of [¼, ½, ¼].

11. The adaptive deflicker method according to claim 9 wherein said linear combination has a coefficient of [⅓, ⅓, ⅓].

12. An adaptive deflicker filter for use in converting a non-interlacing scan data into an interlacing scan data, comprising:
   an edge-line detector for receiving a non-interlacing scan data and outputting an enable signal when there is an edge line segment including at least N consecutive edge points detected in said non-interlacing scan data; and
   a deflicker filter electrically connected to said edge-line detector for performing a deflicker operation on said edge line segment in response to said enable signal.

13. The adaptive deflicker filter according to claim 12 wherein said edge line segment consists of M consecutive edge points, each of which is a pixel having a color space value difference with a corresponding pixel of another scan line immediately adjacent to said selected scan line larger than a preset value, and said deflicker operation is performed on a middle one of every N consecutive edge points among said M consecutive edge points.

14. The adaptive deflicker filter according to claim 13 wherein said another scan line immediately adjacent to said selected scan line is above or below said selected scan line.

15. The adaptive deflicker filter according to claim 13 wherein said deflicker operation is performed by a linear combination of color space values of said middle edge point of said edge line segment and respective two pixels of two scan lines immediately adjacent to said edge line segment with a certain linear combination coefficient.

16. The adaptive deflicker filter according to claim 15 wherein said deflicker filter proceeds a [0, 1, 0] linear combination in the absence of said enable signal, and proceeds said linear combination with said certain linear combination coefficient in response to said enable signal.

17. The adaptive deflicker filter according to claim 15 wherein said certain linear combination coefficient is [¼, ½, ¼].

18. The adaptive deflicker filter according to claim 15 wherein said certain linear combination coefficient is [⅓, ⅓, ⅓].

19. The adaptive deflicker filter according to claim 15 further comprising a register electrically connected to said edge-line detector for storing said linear combination coefficient.

20. An adaptive deflicker method for use in converting a non-interlacing scan data into an interlacing scan data, comprising the steps of:
   receiving a non-interlacing scan data;
   performing a deflicker operation only on large-edge points of said non-interlacing scan data, each of which contiguously follows at least P consecutive edge points and contiguously precedes at least P consecutive edge points; and
   converting said non-interlacing scan data into an interlacing scan data.

21. The adaptive deflicker method according to claim 20 wherein said deflicker operation is performed by replacing a color space value of said large-edge point with a combination value of those of said large-edge point and pixels of an upper and a lower scan lines at positions corresponding to said large-edge point.

22. The adaptive deflicker method according to claim 21 wherein said combination value is a linear combination value of color space values of three pixels of three consecutive scan lines, respectively, at corresponding positions.

23. The adaptive deflicker method according to claim 22 wherein said linear combination value is obtained with a linear combination coefficient selected from a group consisting of [¼, ½, ¼] and [⅓, ⅓, ⅓].

24. The adaptive deflicker method according to claim 20 wherein an edge point is determined by the steps of:
  comparing a color space value of a first pixel of a selected scan line with that of a second pixel of another scan line immediately adjacent to said selected scan line at a position corresponding to said first pixel; and
  determining said first pixel to be an edge point when the norm of a color space value difference of said first and second pixels is larger than a preset value.

\* \* \* \* \*